(12) United States Patent
Simske et al.

(10) Patent No.: US 8,917,930 B2
(45) Date of Patent: Dec. 23, 2014

(54) SELECTING METRICS FOR SUBSTRATE CLASSIFICATION

(75) Inventors: Steven J Simske, Fort Collins, CO (US); Malgorzata M Sturgill, Fort Collins, CO (US); Guy Adams, Stroud (GB); Paul S Everest, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 435 days.

(21) Appl. No.: 13/466,170

(22) Filed: May 8, 2012

(65) Prior Publication Data

US 2013/0301913 A1 Nov. 14, 2013

(51) Int. Cl.
*G06K 9/00* (2006.01)

(52) U.S. Cl.
USPC .................... 382/165; 382/112; 382/225

(58) Field of Classification Search
None
See application file for complete search history.

(56) References Cited

U.S. PATENT DOCUMENTS

| | | | |
|---|---|---|---|
| 6,200,628 B1 | 3/2001 | Rozumek et al. | |
| 7,856,116 B2 | 12/2010 | Rodriguez et al. | |
| 8,059,858 B2 | 11/2011 | Brundage et al. | |
| 8,144,368 B2 * | 3/2012 | Rodriguez et al. | 358/3.28 |
| 2003/0156733 A1 * | 8/2003 | Zeller et al. | 382/100 |
| 2004/0263911 A1 * | 12/2004 | Rodriguez et al. | 358/3.28 |
| 2005/0276478 A1 | 12/2005 | Yu et al. | |
| 2006/0177125 A1 * | 8/2006 | Chan et al. | 382/154 |
| 2007/0014443 A1 * | 1/2007 | Russo | 382/124 |
| 2010/0195894 A1 | 8/2010 | Lohweg et al. | |
| 2012/0114170 A1 * | 5/2012 | Simske et al. | 382/100 |
| 2013/0236085 A1 * | 9/2013 | Chen et al. | 382/145 |
| 2013/0301913 A1 * | 11/2013 | Simske et al. | 382/165 |

FOREIGN PATENT DOCUMENTS

KR 20110132770 12/2011
WO WO 2011005257 A1 * 1/2011

OTHER PUBLICATIONS

Peleg et al. "Multiple Resolution Texture Analysis and Classification", IEEE Transactions on Pattern Analysis and Machine Intelligence, vol. PAMI-6, No. Jul. 4,1984, 6 pgs.
Llado et al. "Simultaneous Surface Texture Classification and Illumination Tilt Angle Prediction", 2003 British Machine Vision Conference, Sep. 2003, 10 pgs.

* cited by examiner

*Primary Examiner* — Sean Motsinger

(57) ABSTRACT

Methods for selecting metrics for substrate classification, and apparatus to perform such methods. The methods include determining a value of a metric from an image of a substrate sample for each substrate sample of a plurality of substrate samples, wherein the metric is indicative of a surface texture of each substrate sample and iteratively assigning substrate samples of the plurality of substrate samples to an aggregate of a particular number of aggregates in response to a value of the metric for each substrate sample until a convergence of clustering is deemed achieved, then determining an indication of cluster tightness of the particular number of aggregates. The methods further include selecting or ignoring the metric for substrate classification in response to the indication of cluster tightness of the particular number of aggregates.

20 Claims, 12 Drawing Sheets

SELECTING METRICS FOR SUBSTRATE CLASSIFICATION

BACKGROUND

Counterfeiting is a major concern for brand owners. It has been estimated that 8% of world trade could be counterfeit goods. This has the potential to create significant health, safety and security threats depending on the nature of the goods. As with other broad security concerns, elimination of counterfeiting is not practicable. It is thus generally important for brand owners to be able to identify counterfeiting.

DETAILED DESCRIPTION

Figure 1:
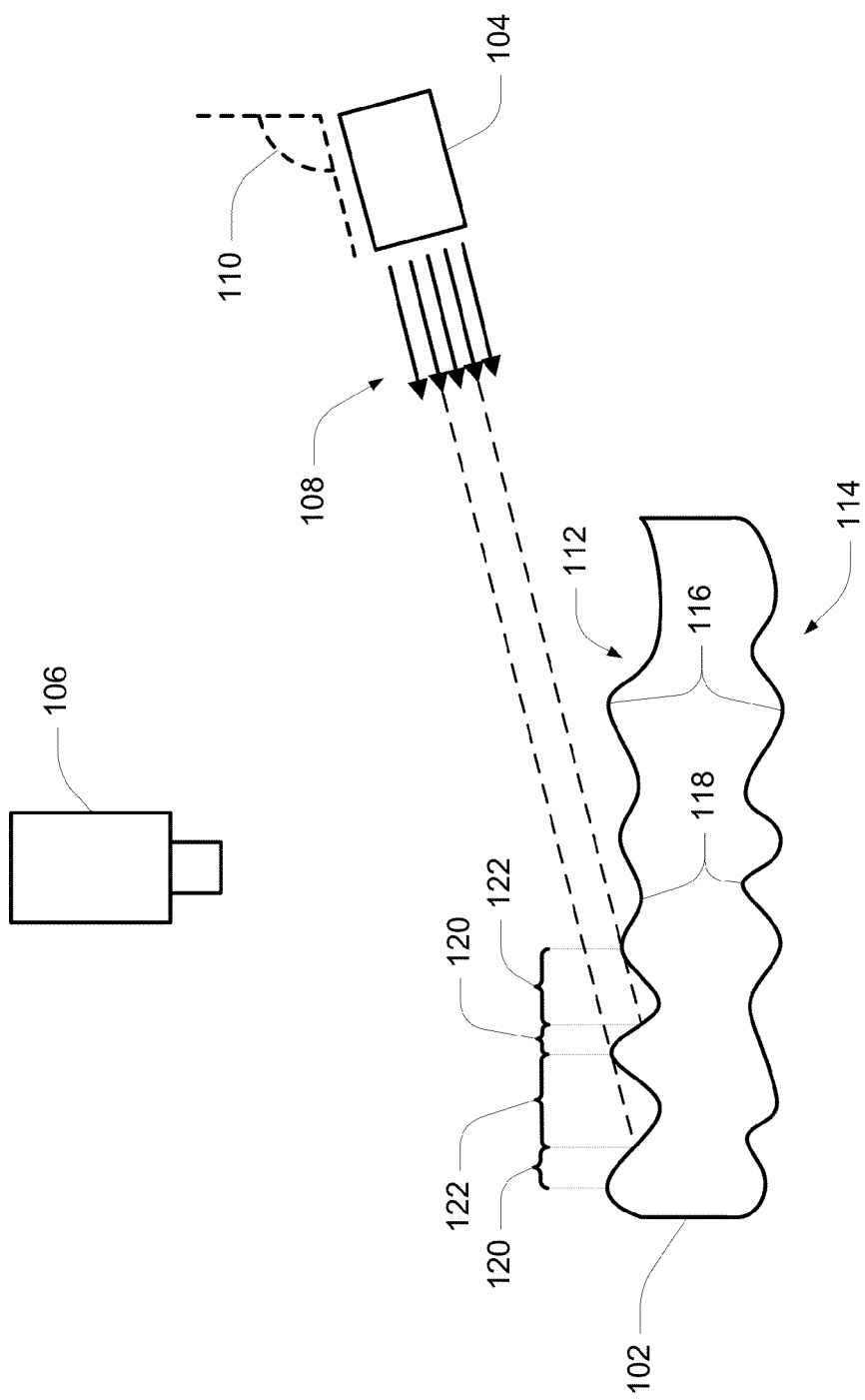
FIG. 1 depicts an optical system for obtaining an image of a substrate in accordance with an implementation.

Product packaging is often used to convey branding information. It is thus important for brand owners to be able to determine whether product packaging or its labeling was produced by an authentic or a counterfeit printer/label converter. Various implementations described herein seek to address this need.

As noted, it may not be practicable to expect to eliminate counterfeiting. A more practical and proactive plan may be to attempt to determine the relative size of each counterfeiter, and address the largest counterfeiters first. Since counterfeit material shows up through different channels, various implementations seek to facilitate identifying commonalities between a number of sample images. Samples exhibiting similar characteristics might be logically suspected of originating from the same source. As such, various implementations seek to classify images of product packaging (e.g., boxes, cartons, labels, etc.) into like groupings based on metrics related to the surface texture of the substrate (e.g., paper, cardboard, card stock, label stock, etc.) of that product packaging. While various implementations are described in relation to fiber-based substrates, methods disclosed herein are applicable to any substrate, such as textiles, synthetics, ceramics, metals, composites, etc.

Classification generally refers to a statistical process of identifying a sub-population to which an item of interest belongs on the basis of the analysis of metrics of the item of interest against a training set of data containing metrics from other items whose sub-populations are known (e.g., deemed to be known). Known classifier engines include Bayesian classifier engines, Gaussian classifier engines, AdaBoost (Adaptive Boosting) classifier engines, SVM (Support Vector Machine) classifier engines, etc. As used herein, a classifier engine is a combination of software (e.g., machine-readable instructions) and hardware (e.g., a processor), such that the software is configured to cause the hardware to predict how a new item should be classified based on shared or similar metrics of other items, which may include previously classified items. While various implementations utilize the output of one or more classifiers, they are not tied to any single or particular type of classifier.

Various implementations will be described with reference to classification of substrates in response to images (e.g., digital images) of those substrates, whether a substrate is coated or uncoated, printed or unprinted. Various implementations further utilize metrics, i.e., some quantification, of some aspect of the image. Metrics used herein are indicative of a surface texture of the substrate from which an image has been obtained. Where the substrate has received a coating (e.g., fumed silica, alumina, calcium carbonate, etc., generally used to improve or alter printing characteristics) and/or printing (e.g., application of ink, pigment, dye, or other marking material), the metrics remain indicative of a surface texture of the substrate as they seek to measure what artifacts of the underlying substrate surface texture remain after such coating and/or printing. Printing as used herein includes any method of adding marking material to the substrate, e.g., to add an informative or graphic design. Such methods include lithography, flexography, gravure, layering, electrophotography (e.g., xerography), inkjet printing, screen printing, digital printing, etc. It is further noted that different coatings and/or different marking materials and printing methods may be used on different portions of the substrate. Resolution of the image should be sufficient to detect variations in the structure of the underlying substrate. For example, where fibers of a typical paper stock may have a thickness of less than 40 μm, it may be desirable to have an image resolution sufficient to identify individual fibers. Further improvements in resolution may be expected to provide more detailed information about the substrate surface. For certain embodiments, the image resolution is less than 5 μm.

It is noted that it may be that some metrics do not provide a positive contribution to the classification. For example, metrics with high variance may represent just "noise" in the system. Thus, some metrics may in fact be detrimental to the classification (e.g., the metrics contain a false signal or negatively contribute to variability), which can happen, for example, when the math used to calculate the metric includes a discontinuity (such as dividing by zero). Implementations described herein facilitate mitigation or elimination of such detrimental metrics.

Although various implementations are not limited to a particular metric, example metrics could look to a variety of measureable aspects indicative of surface texture. For example, in the case of images, metrics result from manipulation of data representative of one or more images, including power spectrum (e.g., Fourier power spectrum), Entropy levels, grey-level co-occurrence matrices, wavelet transforms (and/or extracted features), Gabor filters and other analytical techniques that provide an indication of surface texture. It is noted that the metrics themselves need not be able to identify a particular texture, but merely be able to identify changes in texture. It is noted that Haar and Daubechies wavelet transforms, in particular, are expected to be useful in distinguishing between different textures, and that Gabor filters are expected to be useful in defining edges (e.g., boundaries of texture and other features of a substrate). Where the substrate, coating and/or marking material and printing method are known (e.g., deemed to be known), such as from a sample of product packaging deemed authentic and produced to some specification, such knowledge may indicate an expectation for a specific type of surface texture, therefore guiding the choice of metrics better suited to detect that type of surface texture. As such, for certain implementations, metrics are selected, at least in part, in response to knowledge of an expected substrate, an expected coating on the substrate, and/or an expected marking material and printing method used on the substrate.

FIG. 1 depicts an optical system for obtaining an image of a substrate 102 in accordance with an implementation. The substrate 102 has an upper surface 112 and a lower surface 114. The upper surface 112 and lower surface 114 may each be uncoated or coated (not depicted in FIGS. 1) and unprinted or printed (not depicted in FIG. 1). Each surface 112/114 is depicted to have irregularities in the form of peaks 116 and valleys 118. Note that the substrate 102 and its peaks 116 and valleys 118 are not intended to be drawn to scale, but merely to represent that the surfaces 112/114 are not smooth at some level of image resolution.

As one example, substrate 102 may represent a portion of product packaging formed of card stock, the upper surface 112 might represent the coated and printed exterior of the product packaging, and the lower surface 114 might represent the unprinted and uncoated inside of the product packaging. In this example, the peaks 116 of lower surface 114 might represent individual fibers of the card stock and the valleys 118 of the lower surface 114 might represent voids in between fibers, while the peaks 116 of the upper surface 112 might represent high spots of the exterior of the product packaging, and the valleys 118 of the upper surface 112 might represent low spots of the exterior of the product packaging. Although the coating and marking material would typically tend to smooth the transitions between fibers and voids, in such an example, such peaks 116 and valleys 118 of the upper surface 112 would still be indicative of the surface texture of the underlying substrate 102.

As shown in FIG. 1, a light source 104 is provided to illuminate portions of the upper surface 112 of the substrate 102, and an imager 106 is provided to obtain an image (e.g., a digital image). The imager 106 is any system capable of capturing an image of sufficient resolution to detect variations in the structure of the underlying substrate, whether produces a tangible image (which could then be digitized) or directly provides a digital image. For various embodiments, the imager 106 includes an image sensor to directly capture a digital image, such as a CCD (close-coupled device) or CMOS (complementary metal oxide semiconductor) image sensor, as are well known. Various configurations of imagers could be used, such as photomicroscopy, image sensors in series with macro lenses, image sensors in series with Dyson relays, etc. A Dyson relay is a catadioptric (i.e., incorporating both refractive and reflective components) symmetrical optical system (i.e., symmetric about a central plane). A Dyson relay is generally afocal (i.e., producing no, or minimal, net convergence or divergence of light) such that it generally has an infinite effective focal length. As such, the resolution of such devices may be limited only by the pixel size of the image sensor with which it is in series, with smaller pixel sizes leading to improved resolution.

For some implementations, the light source 104 is a non-diffuse light source, such as a white LED. Light, represented by arrows 108, exiting the light source 104 impinges on portions of the upper surface 112, as partially shown by the dashed-line extensions from arrows 108. Where the light source 104 is directed at the substrate 102 at an angle 110 that is oblique to a line orthogonal to the general plane of the upper surface 112, peaks 116 and valleys 118 will tend to produce illuminated areas 120, which are in line of sight with the light source 104, and shaded areas 112, which are obscured from the light source 104. These differences in illumination and shading can be imaged by the imager 106, generally appearing as lighter and darker portions, respectively, of the upper surface 112. For various implementations, images may be obtained from either or both of the surfaces 112/114 of each sample of substrate 102.

FIGS. 2A-2D depicts images of various substrates obtained using an optical system of the type described with reference to FIG. 1. Each of the examples of FIGS. 2A-2D represent unprinted substrates. For the examples of FIGS. 2A-2D, a Dyson Relay CMOS imager was used to produce the images. For the examples of FIGS. 2A-2D, the Dyson Relay CMOS imager included a Dyson relay in series with a 3.2 μm/pixel, 3 Mpixel CMOS digital color image sensor, resulting in approximately a 1:1 magnification for each pixel, which allowed a resolution, measured as a modulation transfer function (MTF), of approximately 3.5 μm for a color image. MTF generally measures the highest frequency sine wave reliably measurable by the image sensor.

Figure 2A:
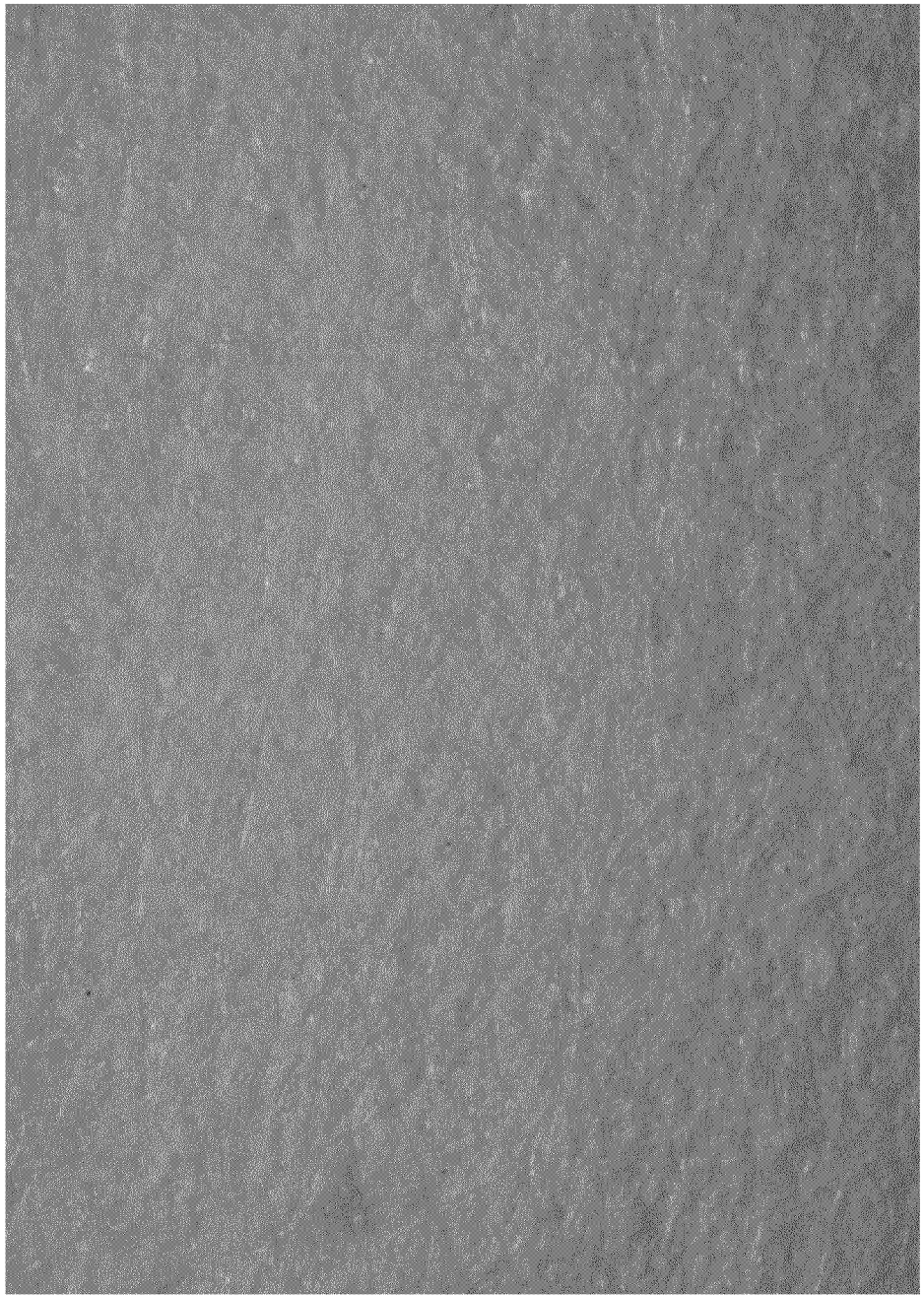
FIGS. 2A-2D depicts images of various substrates obtained using an optical system of the type described with reference to FIG. 1.
Figure 2B:
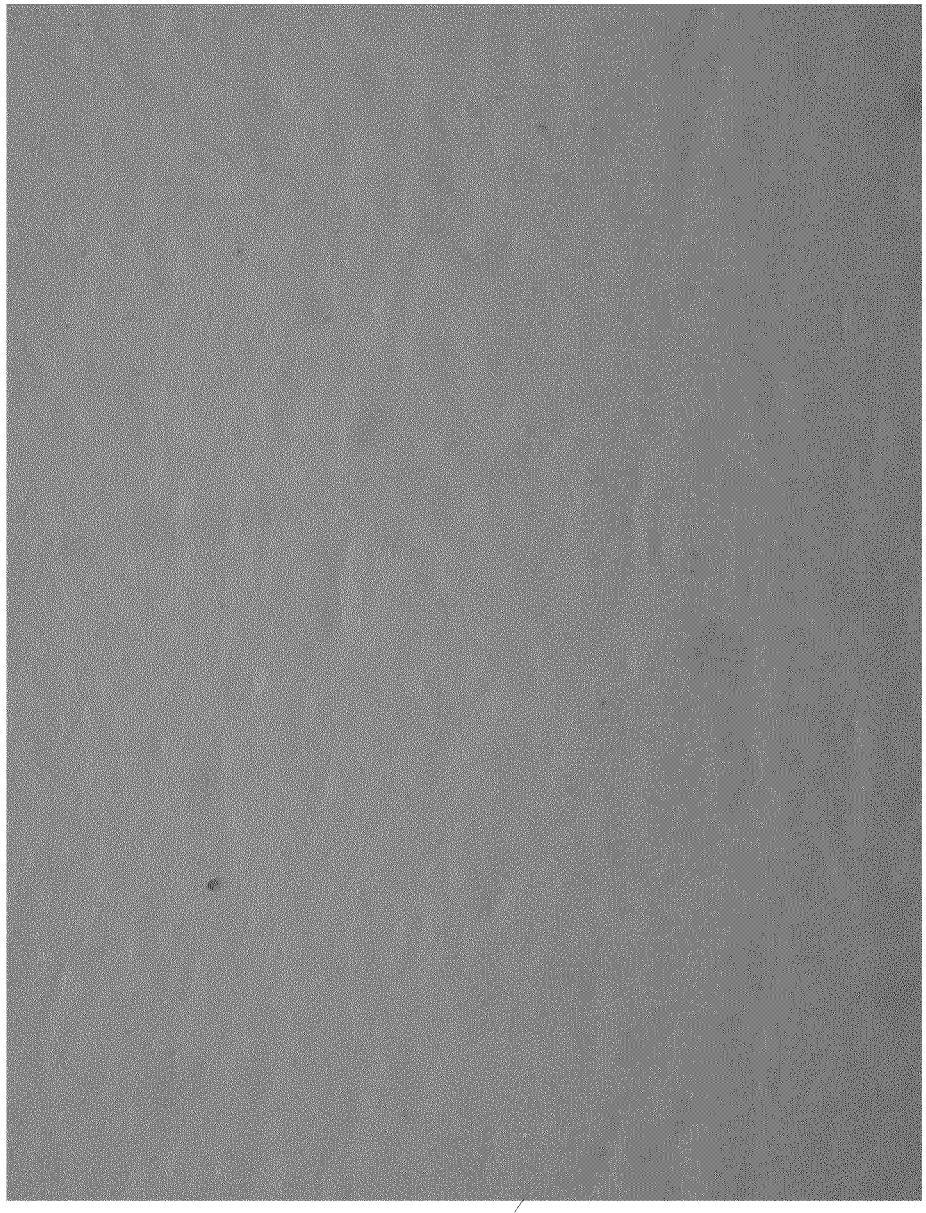
Figure 2C:
Figure 2D:
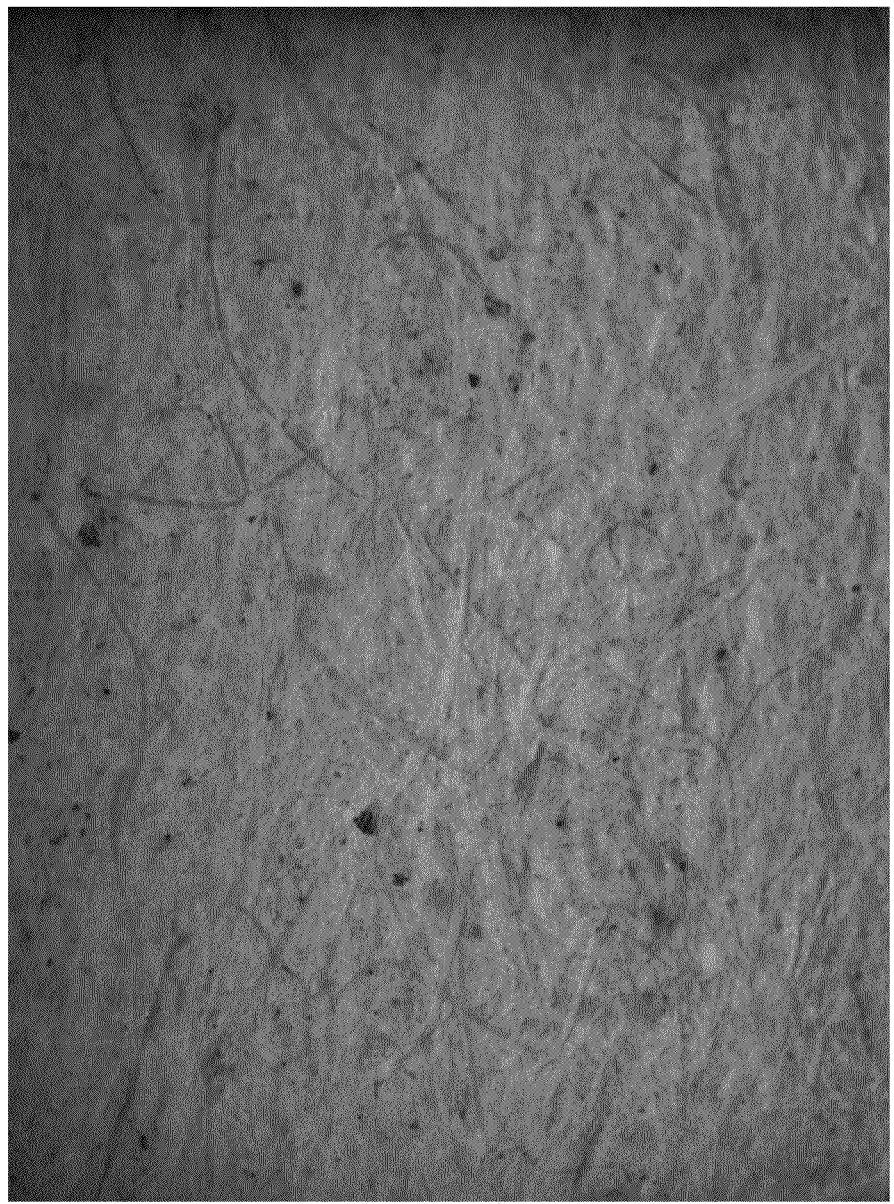

FIG. 2A represents an image 232 of a sample of office paper. As shown in FIG. 2A, individual cellulose fibers are visible throughout the image. FIG. 2B represents an image 234 of a sample of matte paper. While creases in the surface of the sample of matte paper are evident, the comparison to the "rough" nature of the office paper sample in FIG. 2A demonstrates smoothing. FIG. 2C represents an image 236 of a sample of glossy paper. In comparison to FIGS. 2A and 2B, a more "embossed" or smoother texture is expected. The textured elements (e.g., peaks 116 and valleys 118 of FIG. 1) of image 232 (of FIG. 2A) are smaller than the textured elements of images 234 and 236 (of FIGS. 2B and 2C, respectively), which may be coated, cast and/or calendared to produce the desired finish. FIG. 2D represents an image 238 of a sample of cardstock, such as the inside of a product packaging, depicting larger fibers than those visible in the image 232 of FIG. 2A. As demonstrated in FIGS. 2A-2D, images of these various substrates vary due to their varying surface textures.

Figure 3:
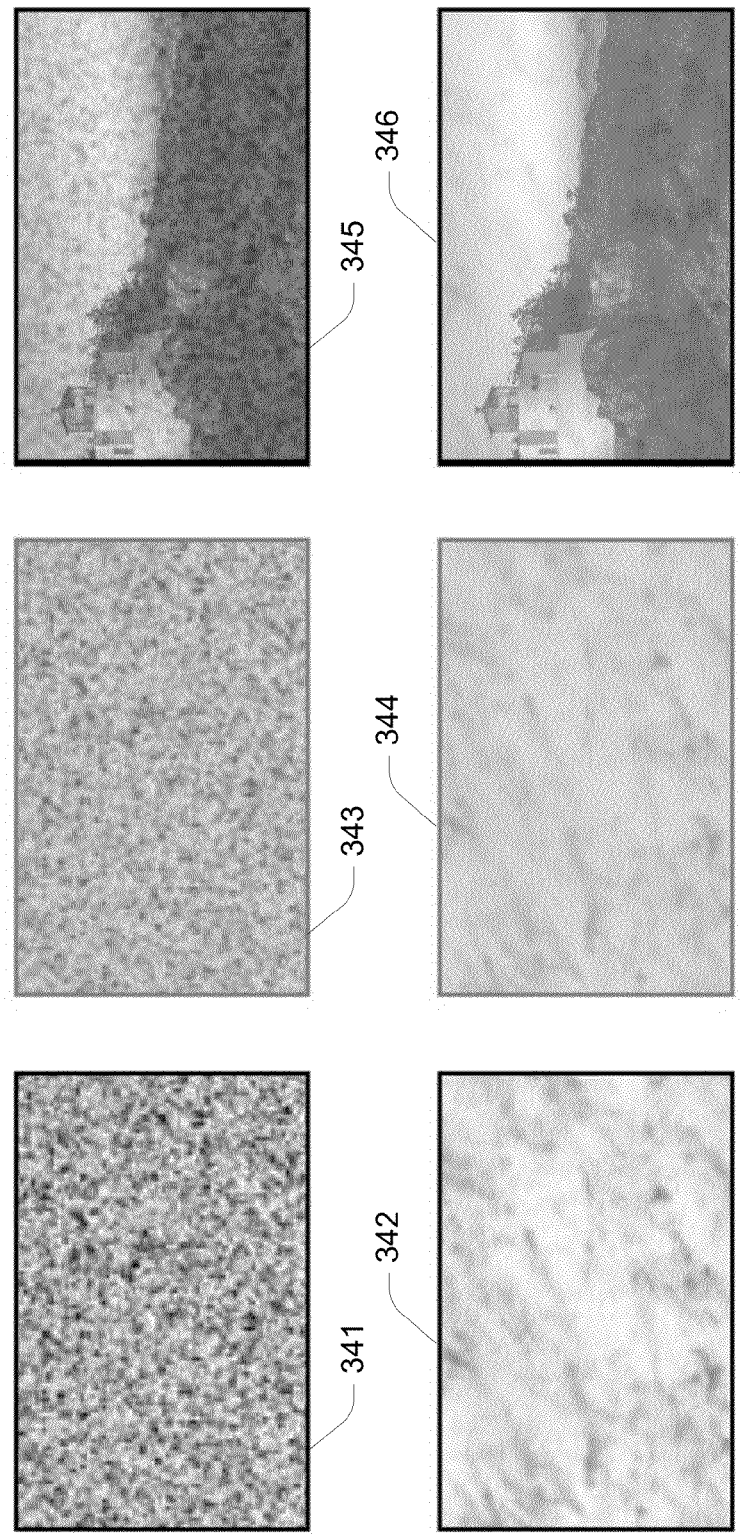
FIG. 3 depicts examples of images as might be obtained from different substrates without printing, with single-color printing, and with general color printing in accordance with an implementation.

FIG. 3 depicts examples of images as might be obtained from different substrates without printing, with single-color printing, and with general color printing in accordance with an implementation. As noted earlier, textured elements of a substrate might be expected to soften or smooth as coating is applied (e.g., to improve or alter printing characteristics) and/or as marking material is applied (i.e., upon printing of the substrate, such as with branding information). Images 341, 343 and 345 represent images as might be obtained from an unprinted and uncoated substrate, that uncoated substrate printed with a solid color, and that uncoated substrate printed with general color, respectively. Images 342, 344 and 346 represent images as might be obtained from an unprinted and coated substrate, that coated substrate printed with a solid color, and that coated substrate printed with general color, respectively. The images 341-346 depict that while change in the image is expected as coating and/or marking material is applied, indication of the underlying surface texture will generally remain at some level of image resolution.

Figure 4:
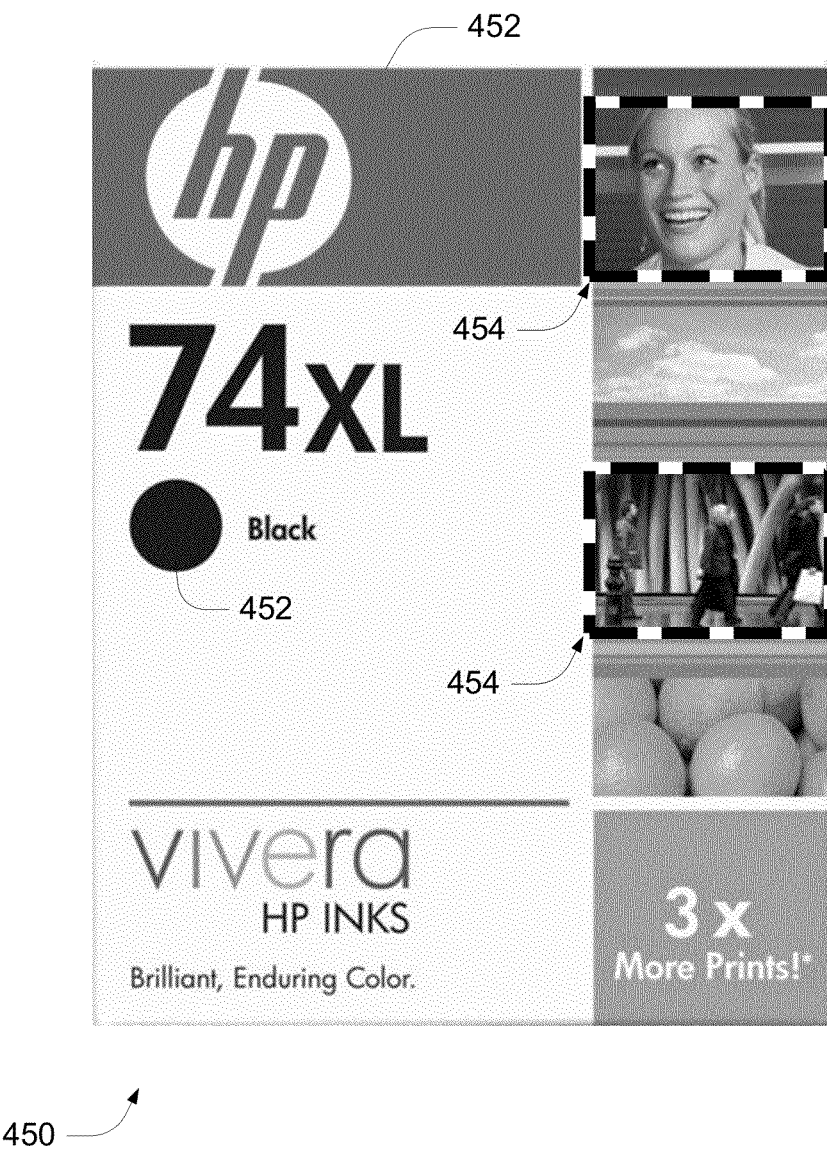
FIG. 4 depicts an example of a portion of product packaging showing areas that might be imaged for use with various implementations.

FIG. 4 depicts an example of a portion of product packaging 450 showing areas that might be imaged for use with various implementations. For example, the portion of product packaging 450 may be the front panel of a box for retail display of an ink cartridge. The portion of product packaging

450 might be formed of cardstock that has been coated and printed. Elements 452 might represent areas where images of solid color might be obtained, while elements 454 might represent areas where images of general color might be obtained. The inside of the portion of product packaging 450 (not shown in FIG. 4, but FIG. 2D might be representative) might represent areas where images of unprinted and uncoated substrate might be obtained. For various implementations, in obtaining metrics from a substrate sample, e.g., portion of product packaging 450, images might be obtained from only one or some subset of such areas (i.e., unprinted, printed in single color or printed in general color, whether coated or uncoated), and one or more metrics might be obtained from each of these images.

Figure 5:
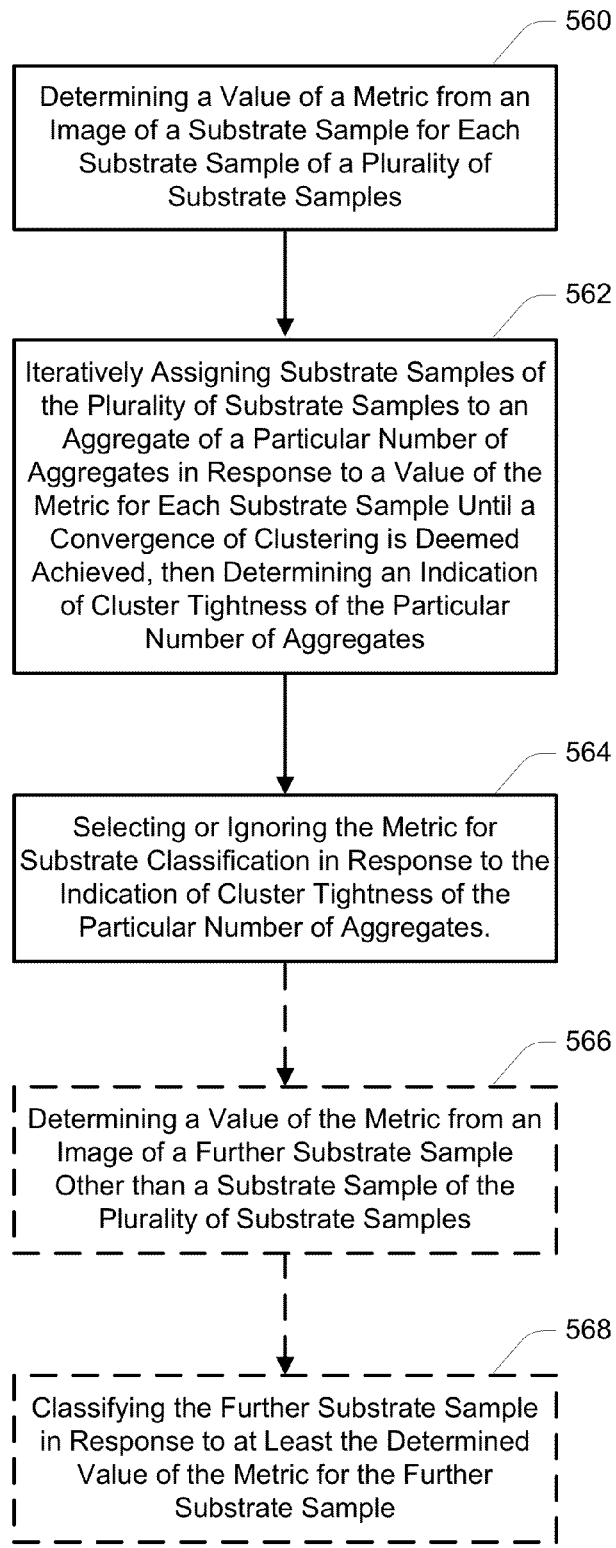
FIG. 5 is a flowchart of a method of selecting metrics for substrate classification in accordance with an implementation.

FIG. 5 is a flowchart of a method of selecting metrics for substrate classification in accordance with an implementation. At block 560, a value of a metric from an image of a substrate sample is determined for each substrate sample of a plurality of substrate samples. The metric is indicative of a surface texture of each substrate sample. As one example, the plurality of substrate samples might be a number of samples of product packaging including authentic product packaging and product packaging that is either deemed to be counterfeit or is otherwise of unknown origin. Images might be taken of the product packaging in an unprinted area (either uncoated or coated), or a printed area (either uncoated or coated) of a single color or of a general color. The images might be taken as described with reference to FIG. 1. For certain implementations, the metric may be selected, at least in part, in response to knowledge of an expected substrate, an expected coating on the substrate, and/or an expected marking material and printing method used on the substrate.

At 562, substrate samples of the plurality of substrate samples are iteratively assigned to an aggregate of a particular number of aggregates in response to a value of the metric for each substrate sample until a convergence of clustering is deemed achieved, then an indication of cluster tightness of the particular number of aggregates is determined. The iterative assignment may include assigning a value to each aggregate, assigning each substrate sample to the aggregate whose assigned value is closest to the value of the metric for that substrate sample, determining a new value of each aggregate in response to values of the metric for the substrate samples assigned thereto, and then reassigning each substrate sample to an aggregate of the particular number of aggregates in response to the value of the metric for each substrate sample, and repeating. Convergence might be deemed achieved, for example, by selecting a limit on the number of iterations performed, such that the convergence is deemed achieved after performing that number of iterations, or by selecting an epsilon (minimum change in an iteration) for population change, such that the convergence is deemed achieved when a change in population from one iteration to the next is less than epsilon (e.g., epsilon=1). For some implementations, multiple conditions could be applied, such as selecting both a limit of the number of iterations and an epsilon, with convergence being deemed achieved if either condition is met.

At 564, the metric is selected or ignored for substrate classification in response to the indication of cluster tightness of the particular number of aggregates. For example, an indication of cluster tightness might utilize an F-score, where F=(Mean-Squared Error Between Aggregate Means)/(Mean-Squared Within the Aggregates). Mean Squared Error is simply sum squared error divided by the degrees of freedom (n−1). Metrics having better discrimination may have higher values of F, and thus may provide more accurate classification. If the indication of cluster tightness meets some criteria, e.g., F-score is greater than some particular number, the metric is selected, and if the indication of cluster tightness fails to meet the criteria, the metric is ignored.

The method of selecting metrics for substrate classification can be extended to the actual classification of a substrate sample. For example, at block 566, a value of the metric, if selected, is determined from an image of a further substrate sample other than a substrate sample of the plurality of substrate samples. As one example, a sample of product packaging of unknown origin, e.g., a suspected counterfeit product, might be obtained. The same type of image used for the metric could then be taken of that sample of product packaging, and the metric could be calculated from the image data. At block 568, the further substrate sample is classified in response to at least the determined value for the metric for the further substrate sample. As one example, the metric could be provided, either alone or in combination with other selected metrics, to a classifier engine, for comparison with previously classified items, e.g., a ground truth set.

Figure 6A:
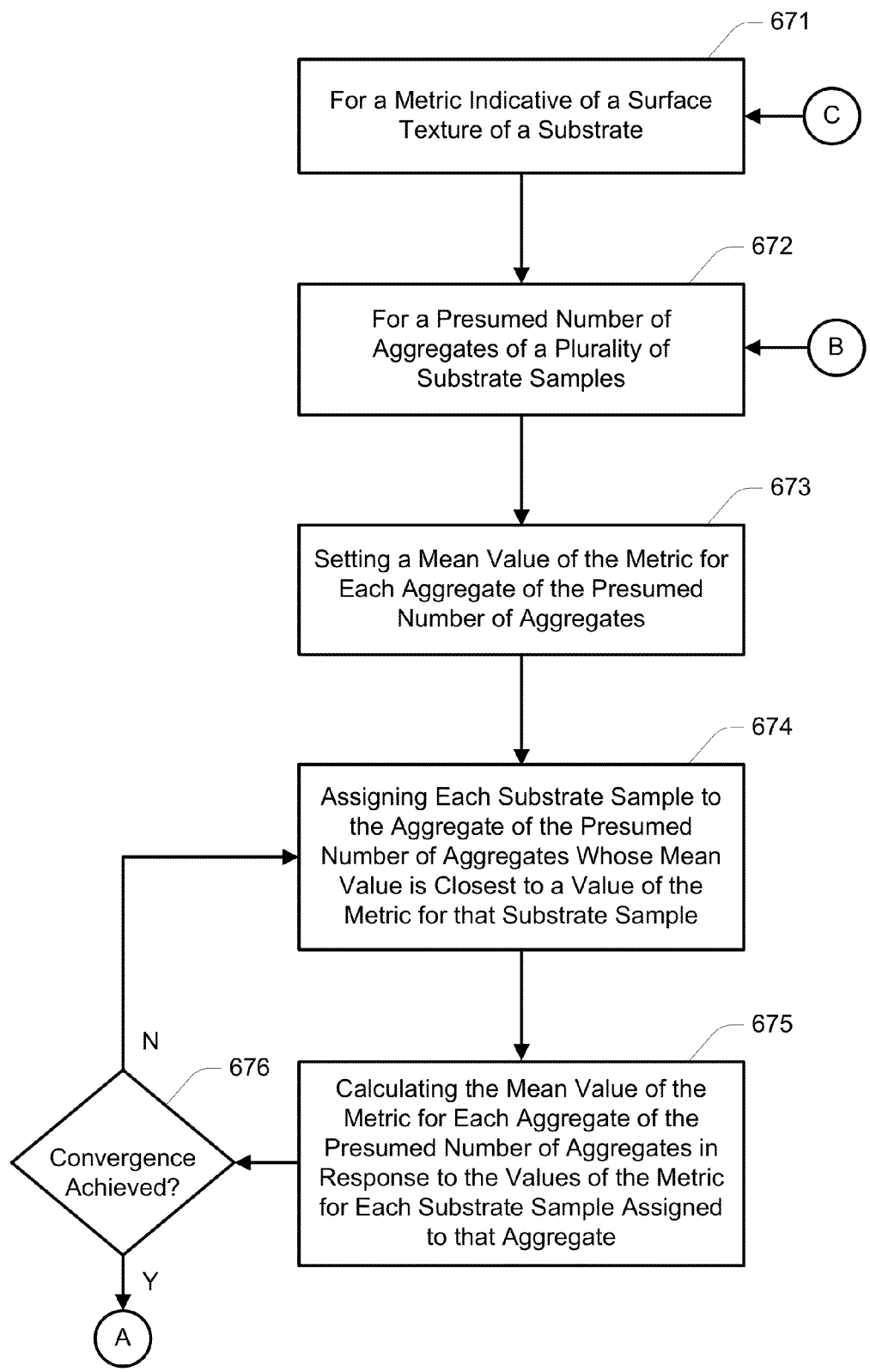
FIGS. 6A-6C are a flowchart of a method of selecting metrics for substrate classification in accordance with another implementation.
Figure 6B:
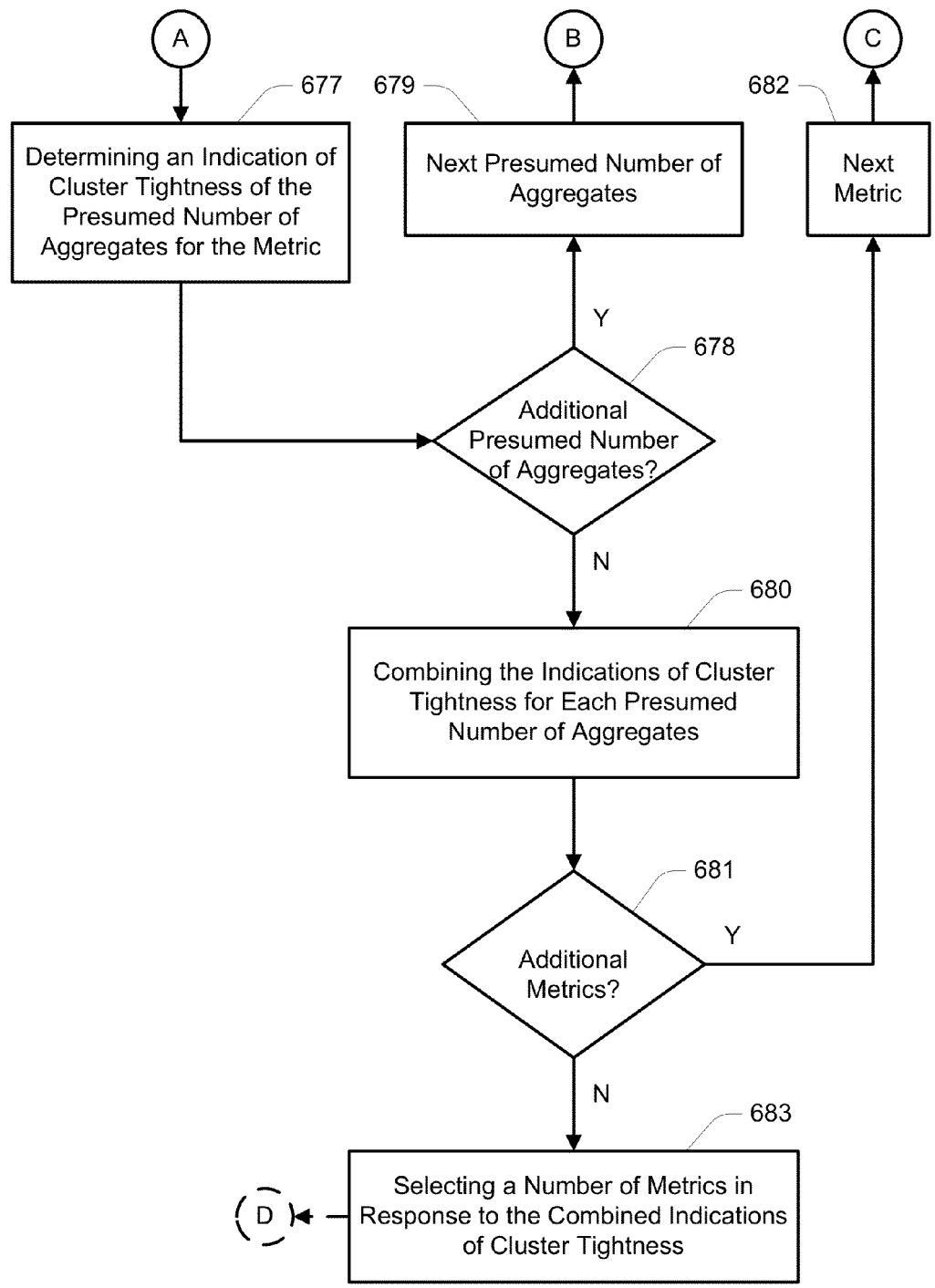
Figure 6C:
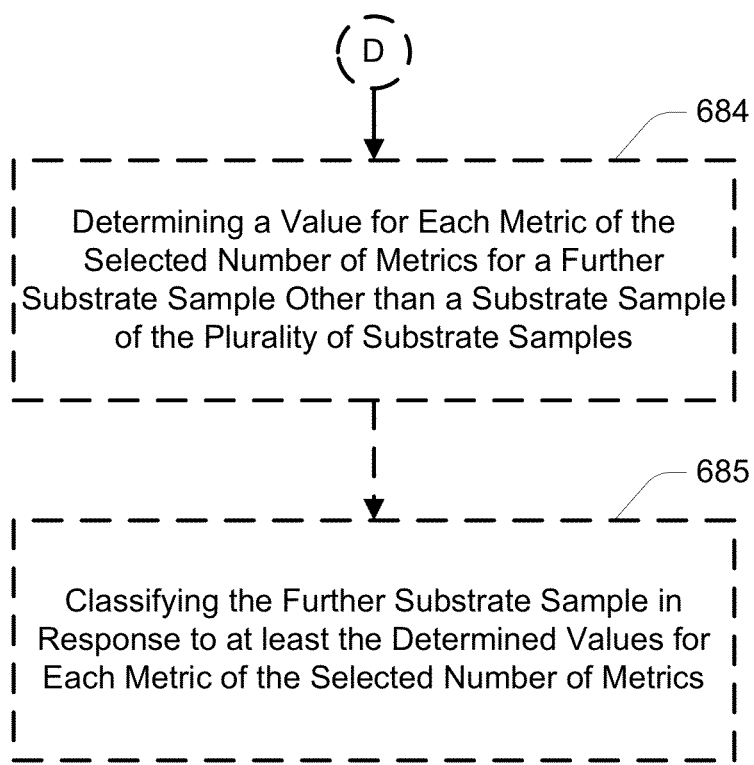

FIGS. 6A-6C are a flowchart of a method of selecting metrics for image processing in accordance with an implementation. The method addresses selection of metrics for substrate classification from a plurality of metrics indicative of a surface texture of a substrate, where the value of each metric has been determined for a plurality of substrate samples. For certain implementations, the plurality of metrics are selected, at least in part, in response to knowledge of an expected substrate, an expected coating on the substrate, and/or an expected marking material and printing method used on the substrate. The method seeks to determine the performance characteristics of each metric relative to the other metrics over the sample set. In doing so, each metric is evaluated for its tendency to group the substrate samples into two or more aggregates. Where the number of classes of the substrate samples is known (e.g., where some samples are deemed to be authentic product packaging and remaining samples are deemed to be counterfeit product packaging, yielding two classifications), the metrics are evaluated for only that number of aggregates, because the presumed number of aggregates is known or deemed to be known. Where the number of classes of the substrate samples is unknown (e.g., where the samples are of unknown origin, or have not otherwise been evaluated), the metrics are evaluated for multiple presumed numbers of aggregates. While the evaluation could theoretically be carried out for any presumed number of aggregates from one to the number of substrate samples, it is believed that statistically relevant results will be obtained by limiting the evaluation from two to the square-root of the number of substrate samples. Note that where the value of the square-root of the number of substrate samples is not an integer value, the value could be converted to an integer value. For example, the value could be truncated to an integer value, the value could be rounded to the nearest integer value, or the ceiling function could be applied to the value, for example.

The method begins at blocks 671 and 672 for an initial metric indicative of a surface texture of a substrate and an initial presumed number of aggregates. Where the number of classes is known or deemed to be known for the substrate samples, the initial presumed number of aggregates may be set to this number of classes. At block 673, a mean value of the metric is set for each aggregate of the presumed number of aggregates. While the mean values could be randomly generated, convergence might be more efficient if the mean values are chosen from the relevant data set. For example, if the presumed number of aggregates is two, mean values might be set as the values of the metric for two of the substrate samples, e.g., the first two samples or two randomly-chosen samples.

At block 674, each substrate sample is assigned to the aggregate of the presumed number of aggregates whose mean value is closest to a value of the metric for that substrate sample. At block 675, the mean value of the metric for each aggregate of the presumed number of aggregates is calculated in response to the values of the metric for each substrate sample assigned to that aggregate. At decision block 676, it is determine whether convergence is deemed to be achieved. Convergence might be deemed achieved, for example, by selecting a limit on the number of iterations of blocks 674 and 675 performed, such that the convergence is deemed achieved after performing that number of iterations, or by selecting an epsilon (minimum change in an iteration) for population change, such that the convergence is deemed achieved when a change in population from one iteration to the next is less than epsilon (e.g., epsilon=1). For some implementations, multiple conditions could be applied, such as selecting both a limit of the number of iterations and an epsilon, with convergence being deemed achieved if either condition is met. If convergence is not deemed to be achieved, the method returns to block 674. If convergence is deemed to be achieved, the method proceeds to block 677.

At block 677, an indication of cluster tightness of the presumed number of aggregates is determined for the metric. At decision block 678, it is determined whether there are additional presumed numbers of aggregates to be evaluated. If the method has reached a final presumed number of aggregates, the method proceeds to block 680. Otherwise, it proceeds to block 679, where a next presumed number of aggregates is generated, e.g., incremented by one, decremented by one, or otherwise modified. Where the number of classes is known or deemed to be known for the substrate samples, the initial presumed number of aggregates may also be the final presumed number of aggregates.

At block 680, the indications of cluster tightness for each presumed number of aggregates are combined. For example, the indications of cluster tightness for each presumed number of aggregates might be summed. Where each metric is evaluated using the same set of substrate samples, normalization of the indications is not expected to provide a benefit. However, should one metric be evaluated using a different set of substrate samples, e.g., due to corruption of data for one or more samples, weighting of the results may be warranted.

At decision block 681, it is determined whether there are additional metrics to be evaluated. If the method has reached a final metric, i.e., all metrics of the plurality of metrics have been evaluated, the method proceeds to block 683. Otherwise, it proceeds to block 682, where a next metric is selected.

At block 683, a number of metrics are selected in response to the combined indications of cluster tightness of the particular number of aggregates. For example, an indication of cluster tightness might utilize an F-score, as described above. For certain implementations, each metric of the plurality of metrics meeting some criteria are selected. For example, the criteria may be to select some number of metrics having the best indications of cluster tightness relative to the other metrics of the plurality of metrics, e.g., the ten metrics demonstrating the relative best indications of cluster tightness. As a further example, the criteria may be to select those metrics having a particular value of their indication of cluster tightness, e.g., F-score is greater than some particular number. Other criteria could further be used.

The method of selecting metrics for substrate classification can be extended to the actual classification of a substrate sample. For example, at block 684, a value for each metric of the selected number of metrics is determined for a further substrate sample other than a substrate sample of the plurality of substrate samples. As one example, a sample of product packaging of unknown origin, e.g., a suspected counterfeit product, might be obtained. The same type of image used for each respective metric could then be taken of that sample of product packaging, and the metrics could be calculated from the image data. At block 685, the further substrate sample is classified in response to at least the determined values for each metric of the selected number of metrics. As one example, the metrics could be provided, either alone or in combination with other metrics, to a classifier engine, for comparison with previously classified items, e.g., a ground truth set.

Figure 7:
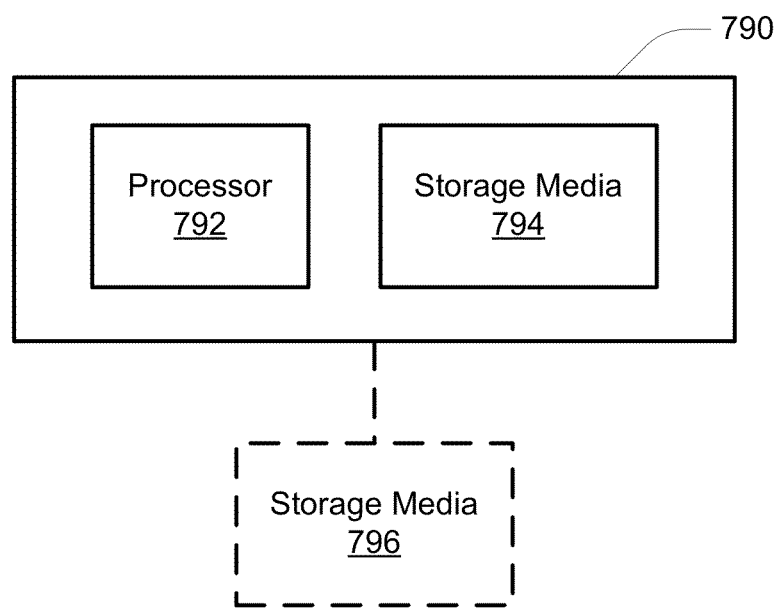
FIG. 7 is a block diagram of an example of a computer system for use with various implementations.

FIG. 7 is a block diagram of an example of a computer system 790 having a processor 792 and a computer-usable non-transitory storage media 794 in communication with the processor 790 for use with various implementations. The storage media 794, whether removable from, a component part of, or accessible to computer system 790, includes a non-transitory storage medium and may have machine-readable instructions stored thereon configured to cause the processor 792 to perform methods disclosed herein. For example, the storage media 794 could store machine-readable instructions to cause the processor 792 to determine values of metrics and to select metrics for substrate classification as described herein. The storage media 794 could further store machine-readable instructions to cause the processor 792 to classify a substrate using the selected metrics, i.e., to provide the function of a classifier engine.

The computer system 790 may further be in communication with a computer-usable non-transitory storage media 796. The storage media 796 includes at least one storage media (e.g., removable or network-accessible storage media) storing the machine-readable instructions configured to cause the processor 792 to perform methods disclosed herein as part of an installation package to store the machine-readable instructions to storage media 794.

What is claimed is:

1. A method for selecting metrics for substrate classification, comprising:
    determining a value of a metric from an image of a substrate sample for each substrate sample of a plurality of substrate samples, wherein the metric is indicative of a surface texture of each substrate sample;
    iteratively assigning substrate samples of the plurality of substrate samples to an aggregate of a particular number of aggregates in response to a value of the metric for each substrate sample until a convergence of clustering is deemed achieved, then determining an indication of cluster tightness of the particular number of aggregates; and
    selecting or ignoring the metric for substrate classification in response to the indication of cluster tightness of the particular number of aggregates.

2. The method of claim 1, further comprising:
    repeating the iterative assigning and determining the indication of cluster tightness for differing numbers of aggregates;
    combining the indications of cluster tightness of each number of aggregates; and
    selecting or ignoring the metric for substrate classification in response to the combined indication of cluster tightness.

3. The method of claim 2, further comprising repeating the method of claim 2 for a plurality of metrics indicative of the surface texture of each substrate sample, wherein selecting or ignoring any metric for substrate classification in response to the combined indication of cluster tightness comprises selecting a number of metrics of the plurality of metrics having the best indications of cluster tightness relative to remaining metrics of the plurality of metrics.

4. The method of claim 1, wherein determining a value of a metric from an image of a substrate sample comprises determining a value of a metric selected, at least in part, in response to knowledge of at least one of an expected substrate, an expected coating on the substrate, and an expected marking material and printing method used on the substrate.

5. The method of claim 1, further comprising:
determining a value of the metric from an image of a further substrate sample other than a substrate sample of the plurality of substrate samples; and
classifying the further substrate sample in response to at least the determined value of the metric for the further substrate sample.

6. The method of claim 1, wherein determining a value of a metric from an image of a substrate sample comprises determining a value of a metric from an image having an image resolution of less than 40 μm.

7. The method of claim 6, wherein determining a value of a metric from an image of a substrate sample comprises determining a value of a metric from an image having an image resolution of less than 5 μm.

8. The method of claim 1, wherein determining a value of a metric from an image of a substrate sample comprises an image of an area of packaging selected from an interior of the packaging and an exterior of the packaging, and wherein the area is of a type selected from the group consisting of uncoated and unprinted, uncoated and printed in single color, uncoated and printed in general color, coated and unprinted, coated and printed in single color, and coated and printed in general color.

9. A method for selecting metrics for substrate classification, comprising:
for each metric of a plurality of metrics indicative of a surface texture of an underlying substrate:
for each presumed number of aggregates of a plurality of substrate samples from an initial value to a final value:
setting a mean value of the metric for each aggregate of the presumed number of aggregates;
for two or more iterations:
assigning each substrate sample to the aggregate of the presumed number of aggregates whose mean value is closest to a value of the metric for that substrate sample;
calculating the mean value of the metric for each aggregate of the presumed number of aggregates in response to the values of the metric for each substrate sample assigned to that aggregate;
determining an indication of cluster tightness of the presumed number of aggregates for the metric;
combining the indications of cluster tightness of each presumed number of aggregates;
selecting a number of metrics of the plurality of metrics in response to the combined indications of cluster tightness of the plurality of metrics.

10. The method of claim 9, further comprising:
determining a value for each metric of the selected number of metrics for a further substrate sample other than a substrate sample of the plurality of substrate samples; and
classifying the further substrate sample in response to at least the determined values for each metric of the selected number of metrics.

11. The method of claim 9, wherein the method is performed having the initial value of the presumed number of aggregates equal to the final value of the presumed number of aggregates.

12. The method of claim 9, wherein the method is performed having the initial value of the presumed number of aggregates and the final value of the presumed number of aggregates equal to a number of classes which the plurality of substrates is deemed to contain.

13. The method of claim 9, wherein the method is performed having the initial value of the presumed number of aggregates equal to two, and the final value of the presumed number of aggregates equal to a square-root of a number of substrate samples in the plurality of substrate samples converted to an integer.

14. The method of claim 9, wherein setting a mean value of the metric for an aggregate of the presumed number of aggregates comprises setting the mean value of the metric for that aggregate to a value of the metric for a substrate sample of the plurality of substrate samples.

15. The method of claim 14, further comprising randomly selecting a number of substrate samples of the plurality of substrate samples for setting mean values of the metric for each aggregate of the presumed number of aggregates in a one-to-one relationship.

16. The method of claim 9, wherein selecting a number of metrics of the plurality of metrics in response to the combined indications of cluster tightness of the plurality of metrics comprises selecting each metric of the plurality of metrics whose combined indication of cluster tightness meets some criteria.

17. The method of claim 9, wherein selecting each metric of the plurality of metrics whose combined indication of cluster tightness meets some criteria comprising selecting the number of metrics having the best combined indications of cluster tightness relative to remaining metrics of the plurality of metrics.

18. A non-transitory computer-usable storage media having machine-readable instructions stored thereon and configured to cause a processor to perform a method, the method comprising:
determining a value of a metric from image data of an image of a substrate sample for each substrate sample of a plurality of substrate samples, wherein the metric is indicative of a surface texture of each substrate sample;
iteratively assigning substrate samples of the plurality of substrate samples to an aggregate of a particular number of aggregates in response to a value of the metric for each substrate sample until a convergence of clustering is deemed achieved, then determining an indication of cluster tightness of the particular number of aggregates;
repeating the iterative assigning and determining the indication of cluster tightness for differing numbers of aggregates;
combining the indications of cluster tightness of each number of aggregates; and
selecting or ignoring the metric for substrate classification in response to the combined indication of cluster tightness.

19. The non-transitory computer-usable storage media of claim 18, wherein the non-transitory computer-usable storage media stores the machine-readable instructions as part of an installation package to store the machine-readable instructions to another non-transitory computer-usable storage media in communication with the processor.

20. The non-transitory computer-usable storage media of claim 18, wherein the method further comprises:

determining a value of the metric from image data of an image of a further substrate sample other than a substrate sample of the plurality of substrate samples; and
classifying the further substrate sample in response to at least the determined value of the metric for the further substrate sample.

* * * * *